United States Patent Office 3,799,795
Patented Mar. 26, 1974

3,799,795
METHOD OF COATING GLASS SURFACE AND PRODUCTS PRODUCED THEREBY
James E. Crawford and Richard H. Russell, Adrian, Mich., assignors to Owens-Illinois, Inc.
No Drawing. Filed Dec. 9, 1971, Ser. No. 206,493
Int. Cl. B44d 1/20; C03c 17/32
U.S. Cl. 117—54                 11 Claims

ABSTRACT OF THE DISCLOSURE

The lubricity and scratch resistance of a glass surface are improved by applying a pyrolyzable tin or titanium compound to the hot glass surface to form a substantially colorless tin or titanium oxide layer thereon, and then applying, directly upon the oxide layer, an aqueous solution of a water-soluble thermosetting ester which is a reaction product of (a) a non-ionic surfactant that contains at least one alcoholic hydroxy group with (b) a polycarboxylic acid or anhydride of the class consisting of aliphatic dicarboxylic acids and anhydrides having not more than six carbon atoms and benzene polycarboxylic acids and anhydrides having from 3 to 4 carboxyl groups, drying and setting the ester to produce a transparent, substantially colorless insoluble coating layer. The resulting dual coating has high lubricity, and affords scratch resistance which is much greater than that which would be imparted by either coating alone.

BACKGROUND OF THE INVENTION

The invention relates to the treatment of glass surfaces to impart high lubricity and scratch resistance.

Glass derives its strength from an unblemished surface, and any scratches or flaws which are present on its surface decrease its strength to as little as ¼ of the original value. Glass articles such as jars, bottles and tumblers possess their maximum strength shortly after they are formed. Their strength rapidly diminishes when they are subjected to abrasive contact in the course of handling, filling, packaging and shipping.

This problem is particularly acute when glass containers are used by processors of foods and beverages, because the glass containers are subjected to a number of processing operations wherein they are successively washed, filled, closed and packaged for delivery. In spite of precautions taken to minimize scratching and abusive handling, the many washing, sterilizing and other operations to which such containers are subjected cause the glass to be rubbed or otherwise contacted in various ways which can cause scratching. The glass containers repeatedly come into contact with each other as they move from station to station and as they are handled in the various operations. Breakage of the glass containers can cause a substantial increase in production costs, particularly if the breakage occurs after the containers have been filled.

In order to minimize scratching and abrading of the surfaces of glass containers, which causes loss of strength and resulting breakage, glass containers have been provided with external coatings which impart scratch resistance.

One type of scratch-resistant coating which is commonly used on the exterior of glass containers is a thin, substantially colorless coating consisting of a layer of tin or titanium oxide bonded to the glass surface and covered by an organic layer consisting primarily of polyethylene. In order to be of commercial value, such a coating must not be substantially affected by the various washing cycles, such as dilute caustic wash, to which glass containers are subjected prior to filling, and must impart high lubricity and scratch resistance when the glass surface is wet as well as when it is dry.

Although a coating of polyethylene, in combination with an underlying layer of tin or titanium oxide bonded to a glass surface, provides a durable, transparent, substantially colorless coating which imparts excellent lubricity and scratch resistance to the glass surface, polyethylene has a disadvantage in that it is insoluble in water. The use of an organic solvent as the vehicle for applying a coating of polyethylene is undesirable because of its cost, and because of undesirable properties of the solvent such as flammability and toxicity. Accordingly, it is customary to apply polyethylene coatings to glass containers in the form of aqueous emulsions of polyethylene.

An aqueous emulsion, as distinguished from an aqueous solution, has the disadvantage that the emulsion may become coagulated, producing gummy masses which cause considerable difficulty by plugging pipe lines and spray nozzles. Coagulation of an emulsion may occur when hard water is used in preparing the emulsion, and coagulation also may be caused by freezing, or by agitation which occurs in the pumping of an emulsion. Acidic impurities which enter an emulsion also may cause coagulation.

SUMMARY OF THE INVENTION

The principal object of the invention is to provide a surface coating for glass which may be applied to the glass in the form of an aqueous solution, and which may be set by cross-linking to produce a transparent, substantially colorless insoluble coating layer which imparts high lubricity to the glass surface.

In accordance with the invention it has been discovered that high lubricity is imparted to a glass surface by applying to the glass surface an aqueous solution of a water-soluble thermosetting ester which is a reaction product of (a) a non-ionic surfactant that contains at least one alcoholic hydroxy group with (b) a polycarboxylic acid or anhydride of the class consisting of aliphatic dicarboxylic acids and anhydrides having not more than six carbon atoms and benzene polycarboxylic acids and anhydrides having from 3 to 4 carboxyl groups, drying and setting the ester.

In a preferred embodiment of the invention, excellent scratch resistance and lubricity are provided when the layer of the cross-linked ester is bonded directly to a thin, transparent, substantially colorless layer of tin or titanium oxide which is bonded directly to the glass surface.

One feature of this invention is a method of treating a glass surface to improve scratch resistance and lubricity, by applying a pyrolyzable tin or titanium compound while the glass surface is at a temperature above the pyrolyzing temperature of the compound, to form a transparent, substantially colorless tin, or titanium oxide layer on the glass surface, and then forming a transparent, substantially colorless insoluble overlying layer by applying upon the oxide layer an aqueous solution of a water-soluble thermosetting ester as hereinbefore described, and setting the ester to bond it to the oxide layer.

The use of the tin or titanium oxide coating with an overcoat of the cross-linked ester provides a dual coating which affords scratch resistance that is greater than the sum of the scratch resistance that would be afforded by the oxide coating alone plus the scratch resistance that would be afforded by the cross-linked ester coating alone.

DESCRIPTION OF THE PREFERRED EMBODIMENTS

The aqueous solution of a water-soluble thermosetting ester may be applied directly to a glass surface in the practice of the invention. However, in the preferred embodiment of the invention the glass surface to which the aqueous solution is applied is a surface which has been provided with a transparent, substantially colorless tin or titanium oxide layer.

In accordance with the preferred embodiment of the invention, a glass surface, which may be in the form of an article of manufacture such as a bottle, jar, tumbler or other container, or a sheet of glass, is treated shortly after the article leaves the glass-forming machine, for example as the article is being conveyed to an annealing lehr. A pyrolyzable compound of tin or titanium is applied to the glass surface while it is at a temperature above that at which the compound pyrolyzes. The temperature necessary to pyrolyze a compound of tin or titanium may be between 700° F. and 1300° F., depending upon the particular compound, but usually is between 800° F. and 1200° F.

The compound of tin or titanium which is used in the practice of the present invention is one which upon contact with the heated glass surface reacts to form a substantially colorless, transparent tin or titanium oxide layer composed primarily of $TiO_2$ or $SnO_2$. The oxide layer is intimately bonded to the glass surface, and has an average thickness which may be as much as one micron, but preferably is less than one micron.

The titanium compounds which are suitable for this purpose include the alkyl titanates. The preferred alkyl titanates are those in which the alkyl group contains from 1 to about 8 carbon atoms, as in tetrabutyl titanate, tetraisopropyl titanate and tetrakis(2-ethylhexyl) titanate. Also included among the suitable titanium compounds are the titanium tetrahalides, particularly titanium tetrachloride. The tin compounds that may be used in the practice of the invention include stannous and stannic compounds.

Among the suitable stannic compounds are the stannic halides such as stannic chloride, stannic bromide and stannic iodide. Other suitable stannic compounds are the alkyl stannic carboxylates having the general formula $R_xSn(OOCR')_y$ wherein R and R' are alkyl, and wherein $x$ and $y$ are whole numbers from 1 to 3, the sum of which is equal to four. Each alkyl radical may be a branched or straight chain. R preferably contains 1 to 8 carbon atoms, and may be methyl, propyl, butyl, isopropyl, isobutyl, hexyl, octa or the like. R' preferably contains 1 to 18 carbon atoms and may be the alkyl radical of acetic, stearic, palmitic or lauric acid or the like. Examples of such alkyl stannic carboxylates include dibutyl tin diacetate, dipropyl tin diacetate, dioctyl tin diacetate, dibutyl tin distearate, dibutyl tin dipalmitate, dibutyl tin dilaurate and the like.

The stannous compounds which may be used in the practice of the present invention include stannous halides such as stannous chloride, stannous bromide and stannous iodide, as well as stannous carboxylates having the general formula

$$Sn(OOCR)_2$$

wherein R is an aliphatic or aromatic group. The preferred aliphatic groups are substituted or unsubstituted alkyl radicals having up to 18 carbon atoms. The preferred aromatic groups include phenyl, benzyl, napthyl and the like. Suitable stannous carboxylates include stannous oleate, stannous palmitate, stannous stearate, stannous caproate, stannous laurate, stannous napthenate, stannous tartrate, stannous gluconate, stannous acetate and the like. It is to be understood, however, that dibutyl tin maleate or any other tin or titanium compound may be used which is capable of pyrolyzing to form a substantially colorless tin or titanium oxide layer on the glass surface.

The pyrolyzable tin or titanium compound may be applied to the hot glass surface in any convenient manner. For example, stannic chloride vapor or titanium, tetrachloride vapor, mixed with dry air, may be passed over and contacted with the hot glass surface, or an aliphatic alcohol solution of an alkyl titanate, preferably having a concentration of at least 25%, may be sprayed onto the hot glass surface.

After the glass articles have been coated with a thin, transparent layer of tin or titanium oxide as hereinbefore described, they preferably are passed through an annealing lehr in a known manner where they are progressively cooled. When the glass articles leave the annealing lehr, the aqueous coating composition is applied upon the layer of tin or titanium oxide, using any convenient application apparatus such as a traversing spray nozzle. Typically the glass articles have a temperature of about 300° F. to about 600° F. at the point of application of the aqueous coating composition. The rate at which the aqueous coating composition is applied will be readily selected by those skilled in the art. Exemplary rates may be from about 0.5 to about 5 quarts per 100 square feet of the lehr belt, but usually the rate is about 1 quart per 100 square feet.

The aqueous coating composition which is applied on the layer of tin or titanium oxide, or on the uncoated glass surface, is an aqueous solution of a water-soluble thermosetting ester which is a reaction product of (a) a non-ionic surfactant that contains at least one alcoholic hydroxy group with (b) a polycarboxylic acid or anhydride of the class consisting of aliphatic dicarboxylic acids and anhydrides having not more than six carbon atoms and benzene polycarboxylic acids and anhydrides having from 3 to 4 carboxyl groups.

The ester may be prepared by a conventional esterification reaction, for example by heating the non-ionic surfactant with the acid or anhydride at a temperature up to about 175° C. until the esterification reaction is complete.

One of the reactants used for the esterification may be any aliphatic dicarboxylic acid having not more than six carbon atoms, preferably an unsaturated acid, or any benzene polycarboxylic acid having from 3 to 4 carboxyl groups, or an anhydride of any such acid. Examples of such a substance include oxalic acid, malonic acid, succinic acid, glutaric acid, adipic acid, maleic anhydride, fumaric acid, itaconic acid, citraconic acid, mesaconic acid, trimellitic acid, pyromellitic anhydride, chloromaleic acid, bromomaleic acid, dichloromaleic acid, dichlorofumaric acid, dichloroitaconic acid and the like. Mixtures of the acids or anhydrides may be used for the esterification reaction to produce a mixture of esters if desired.

The other reactant which is used for preparing the thermosetting ester is a non-ionic surfactant which contains at least one alcoholic hydroxy group, such as polyvinyl alcohol.

One general type of surfactant which may be used for esterification with the acid or anhydride is a water-soluble ether of a polyoxyalkylene diol, such as an octadecoxypolyethoxyethanol or tridecoxypolyethoxyethanol having from four to fifty ethoxy groups. In such an ether, which preferably has a molecular weight between 500 and 2000, the polyoxyalkylene diol chains preferably are formed predominantly of oxyethylene groups, but they may contain minor proportions of oxy-1,2-propylene groups. Such ethers may be prepared by reacting a p-alkyl phenol in which the alkyl group has from 6 to 18 carbon atoms, or a monohydric alcohol having from one to 18 carbon atoms, such as methyl ethyl or a propyl, butyl, tridecyl or octadecyl alcohol or a mixture of such alcohols, with ethylene oxide or a mixture of ethylene and 1,2-propylene oxides, as described in U.S. Pat. No. 2,415,755. A preferred example of such an ether is a p-alkylphenoxypolyethoxyethanol in which the alkyl radical has from 6 to 18 carbon atoms, such as an octylphenoxypolyethoxyethanol, nonylphenoxypolyethoxyethanol, hexylphenoxypolyethoxyethanol or dodecylphenoxypolyethoxyethanol having from four to fifty ethoxy groups.

Another type of surfactant which may be used for the esterification reaction is a water-soluble ester of a polyoxyalkylene diol. Such an ester preferably has a molecular weight between 400 and 4000, and the polyoxyalkylene chains preferably consist predominantly of oxyethylene groups, although they may contain minor proportions of oxy-1,2-propylene groups. In the preparation of such an ester, a mixture of polyoxyalkylene diols is first prepared by reaction of water or a dihydric alcohol with ethylene oxide or with a mixture of ethylene oxide and 1,2-propylene oxide. The ester mixture is then prepared by reacting the mixture of polyoxyalkylene diols with a fatty acid, or with a fatty acid chloride or anhydride, using approximately one mole of the fatty acid reactant for each mole of diols, calculated on the basis of the average molecular weight of the diol mixture. The fatty acid reactant preferably is one having not more than 20 carbon atoms, such as acetic, propionic, butyric, 2-ethyl butyric, 2-ethyl hexanoic, lauric, palmitic or stearic acid. An alternative procedure for preparing such esters consists in starting with the fatty acid mono-ester of ethylene or propylene glycol, and reacting that mono-ester with ethylene oxide or a mixture of ethylene oxide and 1,2-propylene oxide. Specific procedures for preparing esters of polyoxyalkylene diols are described in U.S. Pat. No. 2,457,139.

Most of the surfactants hereinbefore described contain only one alcoholic hydroxy group, and are suitable for reaction with an aliphatic dicarboxylic acid having not more than six carbon atoms, or an anhydride of such an acid. On the other hand, a benzene polycarboxylic acid such as trimellitic acid or pyromellitic anhydride may be reacted with a surfactant containing more than one alcoholic hydroxy group, in order to produce an ester which is water-soluble but which will set to an insoluble coating when applied to a hot glass surface. This type of water-soluble ester may contain polyester chains which are cross-linked by esterification of free alcoholic hydroxy groups derived from the surfactant and carboxyl groups derived from the benzene polycarboxylic acid.

A type of surfactant which may be advantageously esterified with trimellitic acid or pyromellitic anhydride is a water-soluble polyoxyalkylene diol in which the polyoxyalkylene chains are formed predominantly of oxyethylene groups and oxy-1,2-propylene groups. Oxybutylene groups may also be present. A mixture of polyoxyalkylene diols may be prepared by reacting ethylene oxide or 1,2-propylene oxide or a mixture of alkylene oxides with water or with a dihydric alcohol such as ethylene glycol, 1,2-propylene glycol, 1,3-propylene glycol, a butylene glycol, diethylene glycol, dipropylene glycol, triethyene glycol, tripropylene glycol or any other dihydroxy aliphatic compound in which the alklene groups contain not more than six carbon atoms. The average molecular weight of a mixture of water-soluble polyoxyalkylene diols used for reaction with trimellitic acid or pyromellitic acid may range from 200 to 5000, but preferably is between 400 and 4000. Specific procedures for preparing mixtures of polyoxyalkylene diols are described in U.S. Pat. No. 2,425,845.

In the polyoxyalkylene compounds which have been described, the number of oxyalkylene groups in the molecule may vary from two to 100, but preferably is between four and 50. The preferred surfactants are the polyoxyalkylene diols and their ethers and esters as hereinbefore described, in which each oxyalkylene group has from two to four carbon atoms.

Although the aqueous coating composition used in the practice of the invention is described as an aqueous solution of an ester, it usually consists of an aqueous solution of a mixture of esters. Often the surfactant used for the esterification reaction consists of a mixture of related substances, which produces a mixture of esters. Also, the product of the esterification reaction may consist of a mixture of half esters and diesters of the polycarboxylic acid. If the number of moles of the polycarboxylic acid used for the esterification reaction is greater than the number of moles of the non-ionic surfactant, the reaction product will consist primarily of the half ester, with an excess of unreacted polycarboxylic acid. On the other hand, if the number of moles of the surfactant is more than twice the number of moles of the polycarboxylic acid, the product of the esterification reaction will consist primarily of the diester with an excess of unreacted surfactant. Any of these mixtures may be used in the aqueous coating composition.

The proportions used for the esterification reaction may range from ½ to 3 moles of the surfactant for each mole of the polycarboxylic acid. It is often advantageous to use between ½ and one mole of a polyoxyalkylene diol for reaction with one mole of trimellitic acid or pyromellitic anhydride. A further ½ mole of the polyoxyalkylene diol mixture may then be added to the aqueous coating composition for each mole of trimellitic acid or pyromellitic anhydride starting material, in order that the added excess of polyoxyalkylene diol may serve as a cross-linking agent when the ester contacts the hot glass.

The surfactant which is used as a reactant in the preparation of the ester is usually a mixture, and the amount of surfactant to be used for the esterification is calculated by using the average molecular weight of the mixture.

In the usual practice of the invention, the aqueous solution of the ester is applied by spraying. For the sake of economy, and in order to produce a thin coating, the concentration of the ester in the aqueous solution is relatively small, usually between 0.1 and 1%.

The following examples are merely illustrative of the present invention and should not be considered to limit its scope in any way.

Example 1

Maleic anhydride (2 parts by weight) was placed in a reaction vessel together with 22 parts of a mixture of nonylphenoxypolyethoxyethanols in which the average number of ethoxy groups was 39. The mixture was stirred and heated to about 145° C. After about 20 minutes at that temperature, the reaction was considered to be complete. The reaction product was then cooled and dissolved in water in a concentration of 0.25% solids to produce an aqueous coating composition for use in the practice of the invention.

Freshly formed glass bottles at a temperature of about 1000° F. were contacted with an air stream containing stannic chloride vapor as the bottles were being carried from the bottle forming machine on a belt conveyor. This air stream, produced by bubbling dry air through liquid stannic chloride, was introduced into a metal enclosure through which the bottles were carried by the belt conveyor in travelling from the bottle forming machine to an annealing lehr. Pyrolysis of the stannic chloride in contact with the hot glass surface produced a clear, substantially colorless, transparent coating of tin oxide on the exterior of the bottles. Although this coating was hard, the bottles could be scratched by firmly rubbing two of them against each other.

As the bottles reached the cold end of the annealing lehr, where their temperature was about 450° F., the aqueous coating composition was sprayed upon the bottles by means of a traversing spray nozzle at the rate of about 1 quart of the composition per 100 square feet of conveying belt. All of the bottles thus treated were found to have a clear, transparent, substantially colorless coating which was hard and which resisted scratching when two of the bottles were rubbed together.

In order to determine the scratch resistance imparted to the bottles, several bottles were subjected to the scratch test described in U.S. Pat. No. 3,323,889. This scratch test is designed to abrade the surface of one glass bottle against the surface of a similar glass bottle. One of the two bottles is fastened securely in a horizontal position in a stationary set of chunks, while a second bottle is fastened in a loading device which permits the second bottle to be moved in a straight line while the second bottle is resting upon the first bottle and while a measured amount of force is transmitted vertically from the second bottle to the first bottle. During the test the axes of the bottles are maintained at an angle of 90° to one another, and the upper bottle is moved at a constant speed of 2.8 inches per minute in a direction at an angle of 45° to the axis of each bottle. In this way, the point of contact on the exterior of each bottle moves along the bottle at a rate of 2 inches per minute in a direction from the shoulder to the base of each bottle. The test is carried out by subjecting each pair of bottles to repeated passes, the amount of force with which the upper bottle is applied against the lower bottle during each pass being greater than the amount of force used in the preceding pass. Prior to each pass, each of the two bottles is rotated to a new position so that during each pass a fresh surface of one bottle is contacted with a fresh surface of the other bottle. Thus the conditions to which one bottle is subjected during each pass are identical to the conditions to which the other bottle is subjected. After each pass, the bottles are examined for scratches, and the test is discontinued when a visible scratch appears. The scratch resistance value which is recorded as the result of the test is the amount of force in pounds which is applied during the pass which produces a visible scratch on at least one of the two bottles. If no scratch is found after the pass during which a load of 100 lbs. is applied, the test is discontinued and the scratch resistance is recorded as 100+.

The dry scratch resistance of each coating was determined by testing several bottles in a dry condition, and the wet scratch resistance of each coating also was determined by conducting the scratch test with the contacting surfaces of each pair of bottles submerged below the surface of a body of water.

Another property of a coated surface of a glass container which tends to protect the surface against abrasion is lubricity. The lubricity of each coating was tested by a lubricity test performed upon the coated bottles. In the lubricity test, two bottles were clamped side by side in a horizontal position on a tiltable fixture, and a third bottle was laid on top of the two clamped bottles, so that the three bottles formed a pyramid, with each of the three bottles lying on its side. The fixture was then gradually tilted at a uniform rate about a horizontal axis lying in a plane perpendicular to the parallel axes of the three bottles. At the instant when the upper bottle began to slide along the two lower bottles, the tilting of the fixture was stopped and the angle of tilt of the fixture relative to its initial horizontal position was measured. This angle was considered to be the angle of repose, which is a measure of the lubricity of the coated surface, a lower angle indicating a higher degree of lubricity.

As the result of these tests, the scratch resistance of the bottles coated by the present method was found to be greater than 100 lbs., both dry and wet. This scratch resistance is considered to be excellent, since the scratch resistance of the untreated glass containers is only about 5 lbs. or less. Also, the scratch resistance of containers which have been provided with only a tin oxide or titanium oxide coating is of the order of approximately 5 lbs., both dry and wet. On the other hand, the scratch resistance obtained in the practice of the invention is greatly reduced if the underlying coating of tin or titanium oxide is omitted. Thus the two coatings in combination provide a scratch resistance which is much greater than the sum of the scratch resistance of the oxide coating alone plus the scratch resistance of the cross-linked ester coating alone.

The lubricity of the glass containers treated in accordance with this example was found to be 4° dry and 12° wet. This lubricity also is excellent, because the lubricity of the untreated glass containers is about 35 to 45°, and most typically 40 to 45°.

Example 2

Glass bottles were treated and tested by a procedure which was the same as that described in Example 1, except that the non-ionic surfactant used was a mixture of nonlyphenoxypolyethoxyethanols in which the average number of ethoxy groups was 49. The tests of the bottles thus treated showed a scratch resistance of more than 100 lbs., both wet and dry. The lubricity of the treated bottles was 4° dry and 23° wet.

In the procedure used in these examples, when the aqueous solution in the form of a spray contacts the hot glass bottles, the water-soluble ester immediately dries and sets by cross-linking to produce a transparent, substantially colorless, insoluble coating which is bonded to the underlying tin oxide layer. Although the setting of the ester to an insoluble coating can be accomplished by spraying the aqueous solution onto a hot surface, the cross-linking may be assisted if desired by the use of ultraviolet light or dielectric heating, or by the incorporation in the aqueous coating composition of a curing catalyst such as benzoyl peroxide, ditertiary butyl peroxide, tertiary butyl peroctoate, tertiary butyl perbenzoate, lauroyl peroxide, tertiary butyl hydroperoxide, isopropyl percarbonate, ozone, hydrogen peroxide or other peroxides, or a source of free radicals such as azobis isobutyronitrile.

Example 3

An aqueous coating composition having a concentration of 0.25% solids was prepared by a procedure which was the same as that described in Example 1 except that succinic anhydride was employed in place of maleic anhydride.

Bottles which had been provided with a coating of tin oxide by the procedure described in Example 1 were sprayed with the aqueous coating composition thus prepared while the bottles were at a temperature of about 425° F., to produce a clear, transparent, only slightly colored coating which was hard and which resisted scratching when two of the bottles were rubbed together.

When the coated bottles were tested by the procedure described in Example 1, the scratch resistance was found to be greater than 100 lbs. dry, and 85 lbs. wet, while the lubricity was found to be 5° dry and 14° wet.

Example 4

Glass bottles were treated and tested by a procedure which was the same as that used in Example 3, except that the non-ionic surfactant used was a mixture of nonylphenoxypolyethoxy ethanols in which the average number of ethoxy groups in the molecule was 49. The tests of the bottles thus treated showed a scratch resistance of more than 100 lbs. dry, and 85 lbs. wet. The lubricity of the treated bottles was 6° dry and 16° wet.

In Examples 3 and 4, spraying the aqueous coating composition upon the hot glass bottles produced a transparent substantially insoluble coating which was only slightly colored and was bonded to the underlying tin oxide layer. It is believed that in this case cross-linking may have been produced by hydrogen extraction.

While the invention has been described above to enable one skilled in the art to practice the same, it will of course be apparent that modifications are possible which, pursuant to the patent statutes, are comprehended within the scope of the present invention.

What is claimed is:

1. A method of treating a glass surface comprising the steps of applying to the glass surface an aqueous solution of a water-soluble thermosetting ester which is a reaction product of (a) a non-ionic surfactant that contains at least one alcoholic hydroxy group with (b) a polycarboxylic acid or anhydride of the class consisting of unsaturated aliphatic dicarboxylic acids and anhydrides having not more than six carbon atoms and benzene polycarboxylic acids and anhydrides having from 3 to 4 carboxyl groups, drying and setting the ester to produce a transparent, substantially colorless insoluble coating layer which imparts high lubricity to the surface.

2. A method according to claim 1 wherein the glass surface to which the aqueous solution is applied is a surface which has been provided with a transparent, substantially colorless tin or titanium oxide layer by applying a pyrolyzable tin or titanium compound while the glass surface is at a temperature above the pyrolyzing temperature of the tin or titanium compound.

3. A method according to claim 2 wherein the aqueous solution is applied to the glass surface by spraying while the surface is at a temperature high enough to cause the ester to dry and set to an insoluble coating.

4. A method according to claim 2 wherein (b) is maleic anhydride.

5. A method according to claim 4 wherein (a) is an alkylphenoxypolyethoxyethanol.

6. A method according to claim 5 wherein (a) is a mixture of nonylphenoxypolyethoxyethanols having an average of four to fifty ethoxy groups.

7. An article of manufacture comprising a glass surface having a coating that provides high lubricity, said coating comprising a thin, transparent, substantially colorless insoluble layer of a cross-linked ester which is the product of the setting of a water-soluble thermosetting ester which is a reaction product of (a) a non-ionic surfactant that contains at least one alcoholic hydroxy group with (b) a polycarboxylic acid or anhydride of the class consisting of unsaturated aliphatic dicarboxylic acids and anhydrides having not more than six carbon atoms and benzene polycarboxylic acids and anhydrides having from 3 to 4 carboxyl groups.

8. The article of claim 7 wherein the layer of the cross-linked ester is bonded directly to a thin, transparent, substantially colorless layer of tin or titanium oxide which is bonded directly to the glass surface.

9. The article of claim 8 wherein (b) is maleic anhydride.

10. The article of claim 9 wherein (a) is an alkylphenoxypolyethoxyethanol.

11. The article of claim 10 wherein (a) is a mixture of nonylphenoxypolyethoxyethanols having an average of four to fifty ethoxy groups.

References Cited
UNITED STATES PATENTS

| | | | |
|---|---|---|---|
| 3,172,775 | 3/1965 | Shaines | 65—60 UX |
| 3,598,632 | 8/1971 | Long | 117—124 E |
| 3,498,825 | 3/1970 | Wiens | 117—54 |
| 2,425,755 | 8/1947 | Roberts et al. | 260—615 B |

ALFRED L. LEAVITT, Primary Examiner

B. J. LEWRIS, Assistant Examiner

U.S. Cl. X.R.

117—72, 104 R, 106 R, 124 B, 124 E, 124 T, 161 K; 65—60